Nov. 3, 1959  W. B. ZELINA  2,911,586
ELECTRIC CONTROL SIGNAL DERIVING SYSTEM
Filed Nov. 12, 1954
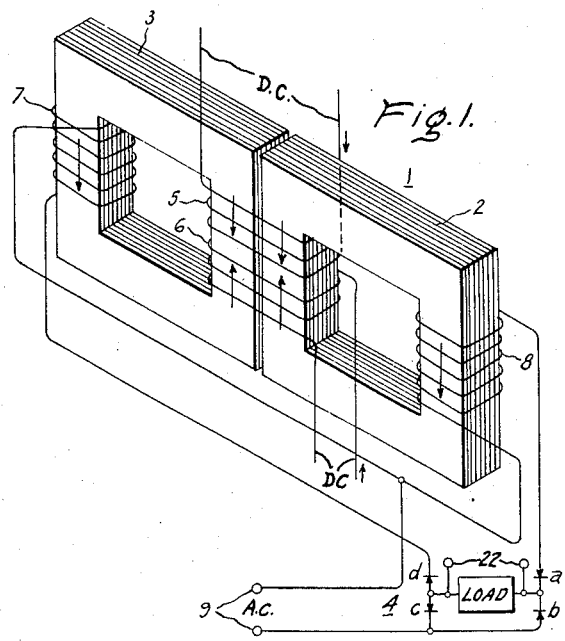
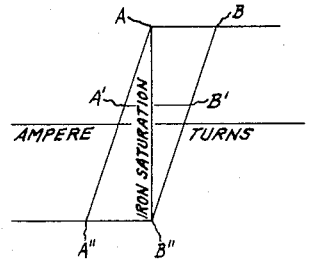
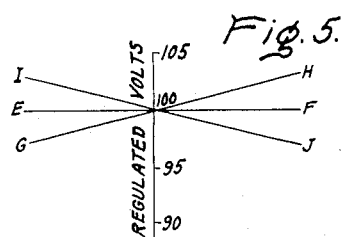
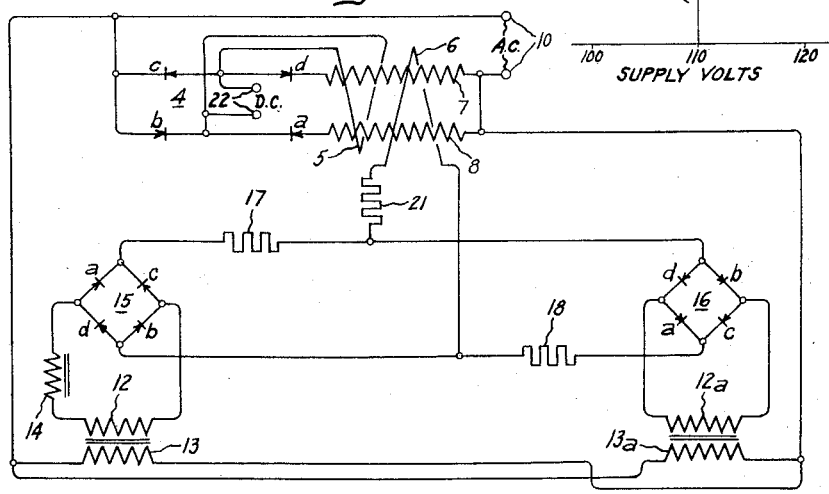
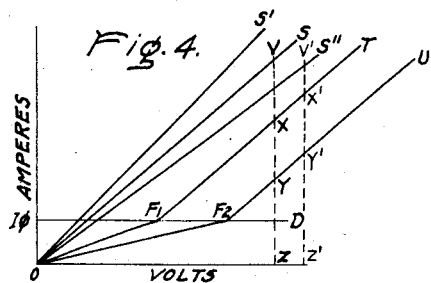
Inventor:
William B. Zelina,
by
His Attorney.

United States Patent Office 2,911,586
Patented Nov. 3, 1959

2,911,586

ELECTRIC CONTROL SIGNAL DERIVING SYSTEM

William B. Zelina, Erie, Pa., assignor to General Electric Company, a corporation of New York Application November 12, 1954, Serial No. 468,211

16 Claims. (Cl. 323—65)

My invention relates to electric control signal deriving systems and more particularly to systems for deriving an electric current control signal which is responsive to variation in the frequency of a measured signal voltage and either insensitive or sensitive to voltage changes in the alternating current signal voltage being measured. Such frequency responsive signals are especially useful in the control of magnetic amplifiers.

In power control applications it is frequently necessary to derive an electric voltage or current signal that is directly proportional to the frequency of the voltage or current signal output of a dynamoelectric machine being controlled. It is desirable that this voltage or current control signal be of sufficient magnitude to unsaturate a self-saturating magnetic amplifier. Often a control system utilizing a frequency responsive control signal is electronic in nature and depends on what is commonly termed an inductance-capacitor tank circuit to determine the proper operating frequency of the signal. The use of an inductance and a capacitor tank to determine the frequency of the signal has the disadvantage of being either unadjustable or of such a low power rating that it is impracticable to obtain a sufficiently large signal to control a magnetic amplifier.

Therefore, an object of my invention is a simple and inexpensive system for deriving a control signal which is responsive to frequency changes, either insensitive or sensitive to voltage changes, and insensitive to harmonic variations in the output signal being measured.

Briefly, in accordance with my invention in one form, I apply the current output of two similar secondary windings of a transformer, whose primary winding is energized by the measured signal voltage, to a loop circuit connected to the transformer secondary windings through bridge rectifiers so that the rectified alternating current from these windings may only flow in one direction around the loop. Across this loop circuit I have connected a reference winding or other sensing means to sense any differential in the currents supplied by the two windings. A saturable reactor, having an unsaturated impedance proportional to the frequency of the applied signal voltage, is connected between one of the secondary windings and the loop circuit to cause a measurable frequency responsive differential between the currents from the windings which differential current flows in the reference winding.

Further objects and advantages of this invention will become apparent and this invention will be better understood from the following description referring to the accompanying drawings. The features of novelty which characterize this invention will be pointed out with particularity in the claims annexed to and forming part of the specification.

In the drawings:

Fig. 1 illustrates a conventional self-saturating magnetic amplifier;

Fig. 2 is a curve showing the saturation of the magnetic amplifier of Fig. 1;

Fig. 3 is a schematic diagram showing one embodiment of my invention as applied to a voltage regulator;

Fig. 4 is a curve showing the volt-ampere characteristics of the transformer signals shown in Fig. 3; and Fig. 5 is a curve of the controlled output of the magnetic amplifier as connected in Fig. 3.

Referring to Fig. 1, the conventional magnetic amplifier consists of two saturable core reactors provided respectively with cores 2 and 3 and arranged to operate as a high gain self-saturating magnetic amplifier. The cores 2 and 3 are constructed of laminated punchings of grain oriented steel whereby the magnetic amplifier 1 has a "square" loop hysteresis characteristic as shown in the curve of Fig. 2 where the axis of the abscissas is the ampere-turns scale and the axis of the ordinates is the iron-saturation scale.

When the cores 2 and 3 are self-saturated by the rectified alternating current from the bridge rectifier 4, the core 2 is saturated by the half-cycle which flows through the winding 8 and then through rectifiers a and c of the bridge rectifier 4, and the core 3 is saturated by the half-cycle which flows through the winding 7 from the rectifiers b and d of the bridge rectifier 4. Thus the bridge rectifier 4 prevents the flow of any unsaturating or negative ampere turns in the alternating current windings 7 and 8 so that the impedance presented by the amplistat is negligible. This impedance remains negligible when both cores 2 and 3 remain saturated. A self-saturation level is shown by the point A on Fig. 2.

The direct current windings 5 and 6 are placed on the cores 2 and 3 to control the saturation level. When the control current or signal supplied to the control winding 5 builds up until it more than counteracts the reference ampere turns of reference winding 6, the saturation level A, representing the sum of control, reference and rectified alternating current ampere turns, is moved to the point A'. This results in the first portion of each half-cycle of the rectified alternating current in the windings 7 and 8 being utilized to saturate the cores 2 and 3. Thus, the unsaturated portion of the alternating current will tend to carry the flux of the amplifier 1 through the saturation curve A'B'BAA' presenting considerable impedance to the rectified alternating current in the windings 7 and 8.

When the control ampere turns of the control winding 5 more than counteract the reference ampere turns of reference winding 6 to such an extent that the net ampere turns produced by the windings 5 and 6 move the core saturation level to the point A" on the curve, the reactance becomes very high during the portions of the voltage half-cycles increasing this flux level to saturation. At this time the hysteresis curve follows the curve A"B"BAA". In a properly designed magnetic amplifier of the type contemplated, enough iron is used so that nearly all of the alternating supply voltage from the terminals 9 appears across the windings 7 and 8 during this condition. Thus, it is possible to control the alternating voltage working output across the terminals 22 by simple controlling the direct current of the reference winding 6 relative to the direct current of the control winding 5.

In this invention I have made a control circuit for deriving a direct current signal responsive to the frequency of the alternating current signal which signal may be adjusted to be responsive to the magnitude of the alternating voltage but which is not affected by the harmonics in the alternating current signal. This signal is particularly but not exclusively adapted to be used with a magnetic amplifier. Another application of this signal using a relay and a carbon pile resistor is illustrated in the Letters Patent of the United States 2,588,319 issued March 4, 1952 to A. Fisher, and assigned to the assignee of this application.

In order to provide a signal of appreciable power rating, I have connected the control winding 5 (Fig. 3)

across the direct current load terminals 22. In one system the reference winding 6 receives excitation from a circuit shown in Fig. 3 to make this current both frequency responsive and voltage insensitive. The number of ampere-turns of windings 5 and 6 are adjusted so that a small percentage change in the control ampere-turns (winding 5) would effect a net ampere-turn signal of considerable magnitude. Hence, it is apparent that the control ampere-turns of the control winding 5 and the load voltage across terminals 22 will follow within a small percentage error the reference ampere-turns or voltage of winding 6.

Referring to Fig. 3, alternating current is applied to the terminals 10 from a generator or other source to be controlled. For the reference source I have shown two identical sensing means shown as similar transformer secondary windings 12 and 12a provided with the same or identical primary windings 13 and 13a to produce similar signals proportional to the magnitude of the voltage of the alternating current signal component of the signal applied across terminals 10 which signal is to be controlled by magnetic amplifier 1. Of course other sensing means such as voltage dropping shunts could be used to provide these signals.

During one-half cycle, the current from the transformer winding 12 passes through the saturable reactor 14, through rectifier $a$ of the bridge rectifier 15, and then through the resistor 17, through resistor 21, through the reference winding 6, and back through rectifier $b$ of the bridge rectifier 15 to the transformer winding 12. During the other half-cycle of the current, the flow is through rectifier $c$, through the loop circuit including the resistor 17, the resistor 21, the reference winding 6, through rectifier $d$ and the reactor 14.

Similarly, one-half cycle of the current from the transformer winding 12a passes through the rectifier $a$ of the rectifier 16, resistor 18, reference winding 6, resistor 21, and then back through the rectifier 16b to the transformer winding 12a. During the other half-cycle, the current flow is the same using rectifiers $c$ and $d$ of the bridge rectifier 16.

It is important that the currents from the two transformer windings 12 and 12a flow in the opposite direction through the reference coil 6 so that only the differential signal current will appear in the winding 6. In another form of this invention it might be preferable to use two electrically isolated bucking windings with each winding connected to a direct current signal source such as a transformer winding or a resistor and a bridge rectifier. The use of two windings has the disadvantage of requiring more space on the control leg of the amplistat than the single reference winding 6.

The rectified alternating currents flowing from both transformer windings 12 and 12a in the loop circuit made up of the bridge rectifiers 15 and 16 and resistors 17 and 18 is clockwise. When resistors 17 and 18 present equal impedance to the current flow, any differential current signal in the reference winding 6 will be caused by the added impedance of reactor 14. In effect, the current from transformer winding 12 flows through the transformer winding 12a, and the differential signal current proportional to frequency of the alternating component in the transformer primary windings 13 and 13a flows from the transformer winding 12a through the sensing means shown as the reference winding 6.

Referring to the volt-ampere curve of Fig. 4, the axis of the abscissas is the volt scale and the axis of the ordinates is the ampere scale. The line OS represents the volt-ampere characteristic of the circuit described in connection with transformer winding 12a. If the saturable reactor 14 were of no effect, the characteristic of the circuit of transformer winding 12 would also be controlled by the resistance of the circuit which, since it is the same as for the circuit of winding 12a, will produce a similar straight volt-ampere characteristic OS. The volt-ampere characteristic of the circuit of the transformer winding 12, however, is not a straight line because of the unsaturated reactive impedance of reactor 14, which impedance increases as the frequency of the alternating signal component increases removing a portion of the alternating current from transformer winding 12 during saturation of reactor 14 and causing the volt-ampere characteristic to follow a line such as $OF_1$ or $OF_2$ depending on the frequency.

The reactor 14 becomes saturated by the current $I\phi$ represented by the horizontal line $I\phi D$. At the frequency $F_1$, $I\phi$ is reached at a relatively low voltage after which the reactive impedance of the reactor 14 does not appreciably affect the current flow and the signal will follow a line $F_1T$ parallel to OS. Thus, the volt-ampere characteristic of the circuit of transformer winding 12 at frequency $F_1$ is shown as the line $OF_1T$. When the frequency increases to $F_2$ the voltage required to produce the saturating current $I\phi$ is increased and the volt-ampere characteristic of the circuit of transformer winding 12 is shown by the line $OF_2U$.

Assume some voltage OZ, which is great enough to saturate reactor 14 for the frequencies contemplated, is produced across the identical transformer windings 12 and 12a. As shown in Fig. 4, the current flow through the transformer winding 12a is equal to VXYZ. At a frequency $F_1$ the current flow through the transformer winding 12 is equal to XYZ. At a frequency $F_2$ this current would be equal to YZ. The differential derived signal current in reference winding 6 is equal to VX or VXY for these frequencies respectively.

During one-half cycle the current VXYZ passes from winding 12a through rectifiers $a$ and $b$ of the bridge rectifier 16. It is well known that conducting rectifiers have little impedance so that the voltage drop across the rectifiers $a$ and $b$ may be neglected. Therefore, the voltage OZ of the winding 12a appears across the rectifiers $c$ and $d$ of the bridge rectifier 16 in a direction to prevent current flow therethrough. It is apparent that under these circumstances the rectifiers $c$ and $d$ will not conduct, so that any current from the transformer winding 12 passing through the bridge rectifier 16 must pass through the transformer winding 12a. Similarly, the voltage across the rectifiers $a$ and $b$ with the rectifiers $c$ and $d$ conducting must be substantially equal to the voltage OZ across transformer winding 12a. Thus, the rectifiers $a$ and $b$ will not conduct during this half cycle. During this half cycle the only path the current from transformer winding 12 will follow is from resistor 17, through the conducting rectifier $d$ of the bridge rectifier 16 through transformer winding 12a through the rectifier $c$ and then through the resistor 18 to the bridge rectifier 15.

Similarly, when rectifiers $a$ and $b$ of the bridge rectifier 15 are conducting, the full voltage of the transformer winding 12 minus the voltage drop across the saturable reactor 14 is across the rectifiers $c$ and $d$ so that these rectifiers will not be conducting. Thus, any current from transformer winding 12a that passes through bridge rectifier 15 must pass through the transformer winding 12 before reaching resistor 17. This will always be true so long as all of the current from the sensing means is fed into the loop circuit through the bridge rectifiers 15 and 16.

It is apparent that the current VXYZ flowing through the transformer winding 12a does not equal the current XYZ flowing through the transformer winding 12. This differential signal or current VX (at frequency $F_1$) passes through the reference winding 6 and its series resistor 21. At frequency $F_2$ this current is equal to VXY.

Referring again to Fig. 4, it is readily apparent that the vertical distance between lines OS, $F_1T$ and $F_2U$ is directly proportional to a frequency of the alternating current signal component applied to the similar transformer windings 12 and 12a so long as the resistors 17 and 18 are equal and the saturable reactor 14 is chosen to be of a size that is saturated by the alternating current signal component in the transformer windings 13 and 13a. Thus, I have developed a simple and inexpensive means for producing an appreciable signal direct current, on the order of half an ampere, that is directly proportional to the frequency of the applied alternating current signal component. The use of this signal current in the reference winding 6 of a voltage regulator, such as is shown in Fig. 3, which uses a very high gain magnetic amplifier to maintain the percentage error difference between the current in the direct current control winding 5 and direct current reference winding 6 very small, yields an output in the control winding 5 which is of considerable power capacity and which is proportional to frequency.

It is also possible with the circuitry shown in Fig. 3 to vary the resistance of the resistor 18 relative to the resistance of the resistor 17 to obtain an impedance path for the current from transformer winding 12a to produce a volt-ampere characteristic shown as the line OS' or OS'' in Fig. 4 so that the signal in reference winding 6 will be responsive to both the frequency and voltage of the alternating current component applied to the transformer primary windings 13 and 13a. A decrease of the resistance setting of the resistor 18 would produce line OS' and would effect a volt-ampere characteristic in the reference winding 6 that increases as voltage increases. Such a characteristic, since its function of voltage is readily controlled, could be of value in many types of regulators or control systems.

It is further apparent from Fig. 3 that if the resistance of the resistor 18 is increased in value to produce the volt-ampere characteristic shown by line OS'', the reference current in reference winding 6 would decrease as the voltage increased from OZ to OZ'. Such a control current could find practical use as a reference signal in a voltage regulator to compensate for the regulating error in the magnetic amplifier between the reference winding 6 and the control winding 5. Referring to Fig. 5, assume that the control system is used to regulate a 60-cycle supply alternating current generator supply that is varying between 100 and 120 volts, as shown on the axis of the abscissas, and a regulated output of 100 volts, as shown on the axis of the ordinates scale, is desired at the load terminals 22. When the resistors 17 and 18 are equal so that the reference winding 6 is voltage insensitive (line EF), the regulated voltage in control winding 5 will follow the reference winding 6 with some regulating error as is shown by line GH (Fig. 5). Now if a similar compensation is set into the system by increasing the resistance of the resistor 18, the reference winding voltage becomes line IJ and the same regulating error existing in the system will produce the regulated voltage line EF which is flat over the entire range of supply voltage. The slope of line IJ may be further increased by an increase of the resistor 18 to compensate for any line drop present.

In summary, the transformer 12—13 and the bridge rectifier 15 produce a direct current signal which is connected by the bridge rectifier 15 into the loop circuit having the resistors 17 and 18 serially placed therein to dissipate the major portion of the voltage from the direct current signal. The direct current signal produced by the transformer 12a—13a and bridge rectifier 16 is connected by the bridge rectifier 16 into this loop circuit so that the two signals may be compared with the differential signal, produced by the reactive impedance of reactor 14, being shunted through the reference winding 6. Because of the connection of control winding 5 across the output of the high gain magnetic amplifier, it must follow the reference winding 6 closely, giving a source of frequency responsive signal that may be used for various purposes.

While I have shown and described the particular embodiment of this invention, further modifications and improvements will occur to those skilled in the art. I desire it to be understood, therefore, that this invention is not limited to the form shown, and I intend in the appended claims to cover all modifications which do not depart from the spirit and scope of this invention.

What I claim as new and desire to secure by Letters Patent of the United States is:

1. Means for deriving an electric current proportional to a frequency of an alternating current signal comprising first means arranged to be electrically connected to the alternating current signal for providing a first direct current proportional to the magnitude of the alternating current signal, a similar second means arranged to be electrically connected to the alternating current signal for providing a parallel second direct current proportional to the magnitude of the alternating current signal, saturable reactor means serially connected in circuit with said first means for limiting said first current in response to the frequency of the alternating current signal, and means for subtracting said first current from said second current whereby a direct current proportional to the frequency of said alternating current signal is derived.

2. A system for deriving a direct electric current proportional to the frequency of an alternating current component, comprising a first means for deriving a first alternating current signal proportional to the voltage of the alternating current component, a second similar means for deriving a second alternating current signal proportional to the voltage of the alternating current component, a closed loop circuit having two similar bridge rectifiers for connecting said first and second means to allow current flow through said loop in one direction so that a current from said first means flows through said first and second means, a saturable reactive impedance connected between said first means and said loop circuit for reducing the current in said first means in response to the frequency of the alternating current component, and a reference winding connected across said loop between said bridge rectifiers for carrying derived differential direct current whereby a portion of said second current flows through said reference coil.

3. An electric circuit for deriving a signal directly proportional to the frequency of an alternating current signal regardless of the magnitude of said alternating current signal, comprising two similar sensing means arranged to be electrically connected to said alternating current signal to provide two substantially identical alternating currents having the same frequency as and proportional to the magnitude of the alternating current signal, a saturable reactive impedance means connected in series with one of said sensing means to reduce the current from said one sensing means in proportion to the frequency thereof, and connection means serially connecting said sensing means for subtracting said reduced current from the other current thereby to derive a signal current proportional to the frequency of said alternating current signal.

4. A system for deriving an electric signal proportional to the frequency of an alternating current signal, comprising first means arranged to be electrically connected to the alternating current signal for providing a first signal proportional to the magnitude of the alternating current component, a second means arranged to be electrically connected to the other signal for providing an identical second signal proportional to the magnitude of the alternating current component, saturable reactive means serially connected to said first means for reducing said signal in proportion to the frequency of the alternating current component, and means for subtracting said first signal from said second signal to produce a third signal having a magnitude proportional to the frequency of the alternating current component.

5. A circuit for deriving a control signal proportional to the frequency of alternating current signal, comprising first transformer winding electrically connected to the alternating current signal for providing a first current proportional to the magnitude of the alternating current component, a second similar transformer winding electrically connected to the alternating current signal for providing an identical second current proportional to the magnitude of the alternating current component, a saturable reactor serially connected to said first transformer winding for reducing said first current in proportion to the frequency of the alternating current component, a sensing means and bridge rectifier means connected between said transformer windings and said sensing means to rectify said currents and apply them to said sensing means in an opposite sense for subtracting said first signal from said second signal to produce a direct current signal proportional to the frequency of said alternating current component in said sensing means.

6. A control system for deriving a direct current proportional to the frequency of an alternating current component, comprising a first means for deriving a first alternating current proportional to the voltage of the alternating current component, a second similar means for deriving a second alternating current proportional to the voltage of the alternating current component, a closed loop circuit having two bridge rectifiers to provide current flow through said loop in one direction, connections for connecting said first alternating current to one of said bridge rectifiers and said second alternating current to the other of said bridge rectifiers to allow direct current flow in a prescribed direction in said loop so that said first current flows through said first and second means, a reference winding for carrying derived differential direct current connected across said loop between said connections, and a saturable reactor impedance serially connected between said first means and said loop circuit for reducing the alternating current from said first means in proportion to the frequency of said alternating current component whereby a portion of said second current flows through said reference winding.

7. In a control circuit for deriving a signal proportional to the frequency of an alternating current component comprising a first transformer winding being connected for deriving a first alternating current signal proportional to the voltage of the alternating current component, a second similar transformer winding being connected for deriving a second alternating current signal proportional to the voltage of the alternating current component, a sensing reference winding, a first bridge rectifier being connected to said first transformer winding and said sensing means for rectifying said first alternating current signal and applying the rectifier signal to said sensing means in one polarity, another bridge rectifier being connected to said second transformer winding and said sensing means for rectifying said second alternating current signal and applying the rectified signal to said sensing means in the opposite polarity whereby the sensing means is effected by a differential current, and a saturable reactor impedance serially connected between said first transformer winding and said first bridge rectifier for reducing the alternating current signal in proportion to the frequency of said alternating current component to provide said differential current.

8. A control circuit for deriving a signal proportional to the frequency of an alternating current component comprising a first transformer secondary winding being connected for deriving a first alternating current signal proportional to the alternating current component, a second similar transformer secondary winding being connected for deriving a second alternating current signal proportional to the alternating current component, a sensing means a first bridge rectifier connected to said first transformer secondary winding and said sensing means for rectifying said first alternating current signal and applying the rectified signal to said sensing means in one polarity, a second bridge rectifier connected to said second transformer secondary winding and said sensing means for rectifying said second alternating current signal and applying the rectified signal to said sensing means in the opposite polarity whereby said sensing means is effected by a differential current, and a saturable reactor impedance serially connected between said first transformer secondary winding and said first bridge rectifier for reducing said first alternating current signal in proportion to the frequency of said alternating current component thereby to provide said differential current.

9. A circuit for deriving a direct current control signal comprising a first means for deriving a first alternating current signal proportional to the voltage of an alternating current component, a second similar means for deriving a second alternating current signal proportional to the voltage of the alternating current component, a closed loop circuit having two bridge rectifier means for connecting said first means and said second means respectively to provide current flow through said loop circuit from said first and second means in one direction so that all of said first current flows through said first and second means, a similar resistor connected in each leg of said loop circuit between each of said bridge rectifier means, a saturable reactive impedance connected between said first means and said loop circuit for reducing the current through said first means in proportion to the frequency of said alternating current component and a reference winding connected to bisect said loop circuit to place one of said resistors and one of said bridge rectifier means on each side of said winding for carrying differential current.

10. A circuit for deriving a direct current control signal comprising a first means for deriving a first alternating current signal proportional to the voltage of an alternating current component, a second similar means for deriving a second alternating current signal proportional to the voltage of the alternating current component, a closed loop circuit having two bridge rectifiers for connecting said first and second means respectively to provide current flow through said loop circuit from said first and second means in one direction so that all of the current from said first means flows through said first and second means, a resistor connected in each leg of said loop circuit between each of said bridge rectifiers, said resistors being of different resistance, a saturable reactive impedance serially connected between said first means and said loop circuit and a sensing means connected to bisect said loop circuit to place one of said resistors and one of said bridge rectifiers on each side thereof for carrying the differential current caused by said saturable reactive impedance and the resistance difference of said resistors.

11. A circuit for deriving a direct current control signal comprising a first transformer winding for deriving a first alternating current signal proportional to the voltage of an alternating current component, a second similar transformer winding for deriving a second alternating current signal proportional to the voltage of the alternating current component, a closed loop circuit having two bridge rectifier means connected to said first winding and said second winding respectively to provide a first direct current and a second direct current flow through said loop circuit from said first and second windings respectively in one direction so that all of said first direct current flows through said first and second windings, a first resistor connected in one leg of said loop circuit between said bridge rectifiers, a second resistor connected in the other leg of said loop circuit between said bridge rectifiers, said first and second resistors being of a different resistance, a saturable reactive impedance connected between said first winding and said loop circuit for reducing the current through said first winding in proportion to the frequency of said alternating current component and a reference winding connected to bisect said loop circuit to place one of said resistors and one of said bridge rectifiers on each side of said reference winding for carrying a differential current caused by said saturable reactive impedance and the resistance difference between said first and second resistors.

12. Means for deriving an electric current proportional to a frequency of a variation of a variable voltage, comprising first means for providing a first alternating voltage proportional to the magnitude of the variation, second similar means for providing a second alternating voltage, equal to said first voltage, saturable reactor means connected in circuit with said first means to reduce current flow in response to said first voltage in proportion to the frequency of the variation of the variable voltage, said reactor means being saturated by said current flow from said first voltage to eliminate the effect of voltage variation on the reduction of current flow by said reactor means, and means for subtracting current from said first means from current from said second means.

13. Means for deriving an electric current proportional to a frequency of a variation of a variable voltage, comprising first transformer means connected to the variable voltage for providing a first alternating voltage proportional to the magnitude of the variation, second similar transformer means connected to the variable voltage for providing a second alternating voltage equal to said first voltage, saturable reactor means connected in circuit with said first means to reduce current therein in proportion to the frequency of the variation of the variable voltage, said reactor means being saturated by said current to eliminate the effect of voltage variation on the magnitude of the reduction of current by said reactor means, and means connected between said first transformer means and said second transformer means for subtracting said current from current from said second means.

14. Means for deriving an electric current having a magnitude proportional to a frequency of a first alternating voltage, comprising first transformer means connected to the first voltage for providing a second alternating voltage proportional to the magnitude of the first voltage, second similar transformer means connected to the first voltage for providing a third alternating voltage equal to said second voltage, saturable reactor means serially connected in circuit with said first means to reduce a first current therein in proportion to the frequency of the first voltage, said reactor means being saturated by said first current to eliminate the effect of voltage variation on the reduction of said first current, and a plurality of rectifier means connecting said first current and a second current from said second means to a loop circuit for subtracting said first current from said second current.

15. An electric circuit for deriving an electric current having a magnitude proportional to a frequency of a first alternating voltage, comprising first transformer means having a primary winding connected to the first voltage and a secondary winding for providing a second alternating voltage proportional to the magnitude of the first voltage, second similar transformer means having a primary winding connected to the first voltage and a secondary winding for providing a third alternating voltage equal to said second voltage, saturable reactor serially connected in circuit with said first transformer secondary winding to reduce a first current therein in proportion to the frequency of the first voltage, said reactor means being saturated by said first current to eliminate the effect of voltage variation on the reduction of said first current and a plurality of rectifier means connecting each of said secondary windings to a loop circuit having unidirectional current flow therein and a means connected thereacross for sensing the difference between the currents from said secondary windings.

16. An electric control signal deriving system for providing a signal lineally proportional to a frequency and insensitive to voltage variations comprising similar first and second means connected to an alternating current voltage for providing a first and a second pulsating unidirectional signal, a saturable reactor connected in circuit with said first means to be saturated by the alternating current and thus reduce said first signal by an amount proportional to the frequency so long as the voltage of the alternating current is sufficient to saturate said reactor, other similar load means connected in circuit respectively with said signals to cause a parallel variation in the after saturation region of said reactor of said signals with variation of voltage, and means for subtracting said first signal from said second signal to derive a signal equal to the reduction caused by said reactor.

References Cited in the file of this patent

UNITED STATES PATENTS

| | | |
|---|---|---|
| 2,254,899 | Laubenheimer et al. | Sept. 2, 1941 |
| 2,666,885 | Bradley et al. | Jan. 19, 1954 |
| 2,719,261 | Bradley et al. | Sept. 27, 1955 |